Patented Jan. 28, 1936

2,029,012

UNITED STATES PATENT OFFICE 2,029,012

PHONOGRAPH RECORD AND METHOD OF MAKING THE SAME

Hal T. Beans, Palisade, N. J., and George H. Walden, Jr., and Louis P. Hammett, New York, N. Y.

No Drawing. Application November 20, 1929, Serial No. 408,668

15 Claims. (Cl. 18—48.4)

The present invention relates to coating compositions adapted particularly for use in making phonograph records.

Our improved moldable composition is adapted to be applied to compressible fibrous material, such as paper, in such manner as to form a coating on one surface thereof, which coating may be molded by heated dies into a grooved phonograph record surface.

The phonograph record herein referred to preferably is made by coating paper of cardboard thickness, such as a hard calendered paper, preferably rag paper, with the chemical reaction product of resorcinol, paranitroaniline, and formaldehyde, to which is added a plasticizer, such as Turkey red oil, and then subjecting the coated paper to a heated die under pressure, whereby a phonograph record of flexibility and toughness is the result.

The preparation of this coating material may be carried out in a suitable mixing kettle having stirring means, and also being provided with heating and cooling means such as hot water coils or jackets through which heating or cooling mediums may be circulated as desired.

In the preparation of this coating composition the following preferred formula may be followed with very satisfactory results. However, the formula is to be understood as being illustrative, only, of the preferred proportions and ingredients to be used.

In preparing this preferred formula, 1000 grams of resorcinol, 1000 cc. of methyl alcohol, and 240 grams of paranitroaniline are mixed together. This mixture is heated to 70° C. until all the solid ingredients are dissolved to form a clear solution. There does not appear to be any evidence of a chemical reaction taking place at this time. 1000 cc. of 40% formaldehyde is then added to the clear solution. Where the formaldehyde is cold, the first result is to tend to cool the solution, but at this time a chemical reaction begins, which produces heat. It therefore is necessary now to cool the fluid composition by the operation of the cooling devices and the temperature should be maintained at substantially 70° C. by such cooling action.

When the formaldehyde is added, a copious yellow precipitate is produced to such an extent as to give the fluid material the character of fairly thick mud. As the reaction continues, the formation of the precipitate rapidly diminishes. After a relatively short period of time, usually about one minute after the precipitate has ceased to form, the precipitate disappears leaving a clear resulting fluid material. The probabilities are that a second chemical reaction has taken place with the excess of formaldehyde, for the reason that if the fluid be cooled the precipitate does not again separate out but the fluid material remains clear. However, it is not desirable to cool the material at this time, but after the chemical reaction has ceased, it may be necessary to add further heat to maintain the fluid at 70° C. for an elapse of about twenty-five minutes. With the continued heating the material tends to increase in a marked degree of viscosity and the heating is continued until such viscosity is reached that a stirring rod lifted from the fluid material will cause the material to string out from the rod like a thick sugar, molasses, or honey. As previously stated, the time when this takes place is about twenty-five minutes after the disappearance of the precipitate. When this point is reached, 1000 cc. of methyl alcohol are added and the fluid material is cooled as rapidly as is convenient. The methyl alcohol is a volatile solvent and appears to act as a thinner without producing a chemical reaction.

After the material has been cooled down to about 30° C., 600 grams of Turkey red oil (which is sulphonated castor oil, neutralized with sodium hydroxide sufficiently to be miscible with water) into which 80 grams of finely ground silica have been incorporated, are introduced into the material and thoroughly mixed therein. It has been found that the Turkey red oil and the ground silica can best be thoroughly mixed by grinding these materials together in an apparatus similar to that used for grinding together pigments of paint and oil. The Turkey red oil which is used as a plasticizer, decreases the brittleness and softens the product. The silica acts as a suitable abrasive, as is common in the art. The playing surface of the phonograph record subsequently made is thus more wear resistant to the action of the needle.

After the material has been cooled, it may be used to coat the paper immediately after mixing. This material we have arbitrarily designated as the "B" composition. Experiments have shown that where the "B" material was used to coat paper, the coating operation may take place as late as eighteen hours after mixing, and the coated paper may be pressed as late as ninety-six hours after coating with completely satisfactory results; however, the pressing within ten or twelve hours after coating is sufficiently early to insure that proper impressions will be made.

The "B" material now ready for use may be applied to a sheet of paper or other suitable material by a suitable coating mechanism that will lay a uniform coating over the paper. The best results are those whereby the thickness of the coating is such that it will dry down to a dried material on the paper. The drying may be brought about by air drying or by the application of gentle heat through suitable drying tunnels or apparatus. It has been found that the material gives best results when dried in a humid atmosphere. Where the material is dried in a heated drying tunnel, it is desirable to add 500 cc. of water to the composition before the coating operation. Although the main ingredients of the "B" material are soluble in the methyl alcohol they are not soluble in water. The water and alcohol are miscible in all preparations and the water has the higher boiling point. If the water be added in sufficient quantity it would cause a precipitation of the "B" material from the alcohol solution, but such precipitation is not desired and therefore the water added to the mixture is in such an amount as will not cause precipitation at this stage in the process. Petroleum naphtha is another liquid which may be used instead of water as it also is not a solvent of the "B" material, is miscible with the methyl alcohol solvent, and has a higher boiling point than said solvent.

During the drying operation, the solvent, for instance methyl alcohol, having a lower boiling point than the non-solvent, for instance water or petroleum naphtha, evaporates first or at a more rapid rate than the higher boiling point liquid which is likewise volatile. Thus the relative proportions of the two volatile liquids change during the evaporation, and the formation of the solid coating on the paper is primarily a precipitation from a non-solvent liquid due to evaporation of the solvent liquid rather than a mere deposition resulting from removal of the solvent. When the "B" coating is dried on the paper to the thickness above specified, it has a depth of about five thousandths of an inch and the under-side of the coating has soaked into the paper sufficiently to form an intimate bond between the body of the paper and the layer of "B" material without any of the paper fibers coming up into or through the five thousandths of an inch thickness of "B" coating material. In other words, the approximate five thousandths of an inch thickness referred to is a solid layer of the "B" material on the paper free from paper fibers.

The coating on the paper when air dried to dryness has a very rough and crinkled appearance due to the fact that it is precipitated in the non-solvent liquid or in the presence of moisture upon the evaporation of the solvent. When dried by heat in a heated tunnel the appearance is usually smoother. The dried coating has practically no strength, is easily friable, and is of a yellowish or a brownish yellow color. The coated paper when dried is ready for the hot pressing operation.

The matrix dies for the phonograph record may be mounted upon a suitable embossing press provided with heating means whereby the dies are raised in temperature to between 150° C. and 225° C., preferably to 200° C. Where a lower temperature is used a longer pressure dwell by the press is desirable for example, with the dies heated to 200° C. one-half second may be a sufficient time to hold the heated dies under pressure against the coating; while at 170° C. the pressing dwell may be five seconds. Also the time of the pressure dwell of the hot dies against the coating is increased slightly as the thickness of the coating is increased. These hot dies are impressed against the coated surface with sufficient pressure to drive the tone beads on the dies into the "B" coating of the paper to produce the finished record. The "B" material molds freely and forms a perfect impression and does not tend to stick to the hot metal dies. When the hot dies come against the "B" composition, the coating material appears to melt and to flow, and a chemical change takes place which transforms the material into a solid, continuous, tough, hard surface with substantial elasticity, and the color has changed to a dark brownish red. These physical and chemical changes take place quickly and are irreversible. The material when molded appears to have a low coefficient of expansion although there is a slight shrinkage which tends to cause the paper to curl slightly across the grain of the paper. The curl is completely obviated by varnishing the back of the sheet of the paper with a nitrocellulose lacquer or other suitable coating which counteracts shrinkage due to the molding of the "B" material.

Experimentation has shown that there may be equivalents for certain of the materials used in the formula, for example, where methyl alcohol is used, ethyl alcohol and other volatile solvents, which do not react with the constituents, may be substituted.

The paranitroaniline appears to have several substitutes such as alkali salts of sulfanilic acid, and also materials of the para-amino-benzoic acid groups, such as the ethyl esters; and also 3 nitro-4 amino-toluene. This group may be classified as aromatic amines substituted in the para-position and having dissociation constants in aqueous solution varying appreciably smaller than $5 \times 10^{-10}$. A further substitute in this group is ortho-nitro-aniline. Another substitute for paranitroaniline appears to be urea, but where urea is used, it is necessary to change the formula slightly in order to maintain the chemical balance. All of the materials above mentioned as substitutes for paranitroaniline are organic amines or amids and are weak nitrogen bases. All of them, except the urea, are negatively substituted aniline derivatives. They act to facilitate and control the formation of the formaldehyde-resorcinol condensation product. They may to a greater or lesser extent become chemically combined in the final product and may remain at least in part as merely mechanically combined.

Phonograph records made in accordance with the present invention when in use give very little needle scratch, have a wearing surface that exceeds that of the ordinary commercial phonograph records, and are light in weight as well as being substantially unaffected by climatic changes. The coating is substantially waterproof so that moisture does not detrimentally affect the record. The molding qualities of the "B" material are such that the pressing operation may be carried on at the normal speed of operation of an embossing press and since the pressure required in the molding operation is not high, a number of dies may be associated upon a single press so that a plurality of records may be molded at each operation of the press.

Having described our invention, what we claim is:—

1. A phonograph record having a fibrous body carrying a record surface of moldable material molded with tone grooves therein; said material including a product resulting from the chemical reaction of resorcinol, paranitroaniline, and formaldehyde.

2. A phonograph record comprising a sheet of absorbent material having a coating of a chemical reaction product of resorcinol, paranitroaniline and formaldehyde formed in the presence of a volatile solvent and including a plasticizer.

3. The method of making a moldable material comprising mixing together resorcinol, alcohol, and paranitroaniline; heating said mixture to 70° C. until solids are dissolved; adding 40% formaldehyde, and maintaining the temperature at substantially 70° C. until the precipitate formed is dissolved; continuing heating at 70° C. until the fluid reaches the consistency of thick molasses, adding alcohol; cooling the solution to 30° C. and adding Turkey red oil.

4. The method of making a moldable material for phonograph records or the like comprising mixing 1,000 grams of resorcinol, 1,000 cc. of methyl alcohol, and 240 grams of paranitroaniline; heating the mixture to 70° C. until the solids have dissolved; adding 1,000 cc. of 40% formaldehyde, and maintaining the temperature at 70° C. until the precipitate formed is dissolved and until the fluid is increased in viscosity to the thickness of thick molasses; adding 1,000 cc. of methyl alcohol and cooling the fluid to 30° C.; adding 600 grams of Turkey red oil, and permitting the fluid to cool to room temperature.

5. The methd of making phonograph records or the like comprising mixing together resorcinol, a material selected from the group consisting of nitroaniline, esters of amino-benzoic acid, nitro-aminotoluene, and urea, and a volatile solvent, and heating the same to substantially 70° C. until the solid ingredients dissolve; adding formaldehyde and maintaining the temperature at substantially 70° C. until the precipitate has disappeared and the fluid has reached a consistency of thick molasses; adding a volatile solvent; adding Turkey red oil; and cooling the fluid, coating fibrous material with said fluid and permitting the coating to dry; and pressing said coating against dies heated to substantially 200° C. to melt said material into a continuous tough, hard, elastic surface.

6. The method of making a flexible phonograph record, including forming a volatile solvent solution of a synthetic resin of resorcinol, formaldehyde and a material selected from the group consisting of salts of sulfanilic acid, nitroaniline, esters of amino-benzoic acid, nitro-amino-toluene, and urea, and a plasticizer for said resin, applying the solution to a suitable base, evaporating the solvent to leave a coating, and fusing and heat hardening the coating by the action of a heated phonograph record die.

7. The method of making a flexible phonograph record, comprising coating a sheet of paper of cardboard thickness with a synthetic resin solution in a volatile solvent having a lower boiling point than water, evaporating the solvent in the presence of moisture to leave the deposit of the synthetic resin in loose crumbly form on the sheet, drying to remove the moisture and fusing and heat hardening the coating by the action of a phonograph record die heated to a temperature between 150° C. and 225° C.

8. A phonograph record having a fibrous flexible body of substantially cardboard thickness, and a flexible coating thereon including a synthetic resin formed of resorcinol, formaldehyde, and a material selected from the group consisting of salts of sulfanilic acid, nitro-aniline, esters of amino-benzoic acid, nitro-amino-toluene, and urea, and a plasticizer for said resin.

9. A phonograph record having a fibrous flexible body of substantially cardboard thickness, and a flexible coating thereon including a synthetic resin formed of resorcinol, formaldehyde and a material selected from the group consisting of salts of sulfanilic acid, nitro-aniline, esters of amino-benzoic acid, nitro-amino-toluene, and urea, and Turkey red oil.

10. The method of making a phonograph record, including the steps of forming a solution of a condensation product of resorcinol, formaldehyde and a material selected from the group consisting of salts of sulfanilic acid, nitro-aniline esters of amino-benzoic acid, nitro-amino-toluene, and urea in a volatile solvent, adding a plasticizer and a liquid miscible with said solvent, of higher boiling point than said solvent and in which said condensation product is insoluble, but insufficient in quantity to cause precipitation of said product, applying the solution to a base, evaporating the solvent and said liquid to leave the material in the form of a coating of particles loosely cemented together, and fusing and heat hardening the coating by the action of a heated phonograph record die.

11. The method of making a phonograph blank adapted to be converted into a phonograph record by the action of a heated phonograph record die, said method including the steps of forming a solution of a condensation product of resorcinol, formaldehyde and a material selected from the group consisting of salts of sulfanilic acid, nitroaniline, esters of amino-benzoic acid, nitro-amino-toluene, and urea in a volatile solvent, adding a plasticizer and a liquid miscible with said solvent, of higher boiling point than said solvent and in which said condensation product is insoluble, but insufficient in quantity to cause precipitation of said product, applying the solution to a base, and evaporating the solvent and said liquid to leave the material in the form of a coating of particles loosely cemented together.

12. The method of making a phonograph record, which includes forming a solution including a synthetic resin, a plasticizer, a solvent for said resin, a liquid miscible with said solvent, of higher boiling point than the latter, and which is a non-solvent for said resin, applying said solution to a base, evaporating the solvent and said liquid therefrom to form a loose crumbly coating on said base, and thereafter fusing and heat hardening said coating.

13. The method of forming a phonograph record blank adapted to be converted into a phonograph record by the action of a heated phonograph record die, which method includes applying to a flexible base a coating including a synthetic resin, a plasticizer, and a material selected from the group consisting of salts of sulfanilic acid, nitro-aniline, esters of amino-benzoic acid, nitro-amino-toluene, and urea in a solvent containing a non-solvent liquid having a boiling point higher than that of said solvent, and evaporating the solvent and said liquid from said base to form a crumbly and easily friable layer.

14. A blank adapted to be subjected to the action of a heated phonograph die to form a flexible phonograph record, said blank including a flexible base and a coating of a formaldehyde resorcinol condensation product, a plasticizer and a material selected from the group consisting of salts of sulfanilic acid, nitro-aniline, esters of amino-benzoic acid, nitro-amino-toluene, and urea, said coating being loosely coherent, crumbly and easily friable.

15. A blank adapted to be subjected to the action of a heated die to form a flexible phonograph record, said blank including a thin flexible base and a loose crumbly coating of a synthetic resin, a plasticizer and a material selected from the group consisting of salts of sulfanilic acid, nitro-aniline, esters of amino-benzoic acid, nitro-amino-toluene, and urea.

HAL T. BEANS.
GEORGE H. WALDEN, Jr.
LOUIS P. HAMMETT.